S. BRUNSON.
Nut-Locks.
No. 153,532. Patented July 28, 1874.
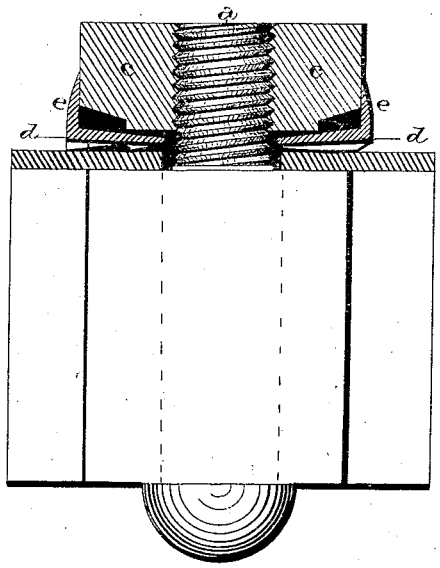
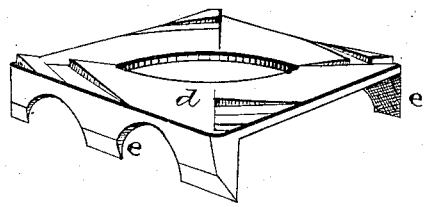
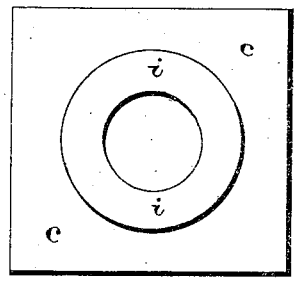
WITNESSES.
F. B. Townsend
E. T. Kaiser
INVENTOR.
Sterne Brunson
per
F. A. Lehmann
Atty.

UNITED STATES PATENT OFFICE.

STERNE BRUNSON, OF BENTON HARBOR, MICHIGAN.

IMPROVEMENT IN NUT-LOCKS.

Specification forming part of Letters Patent No. 153,532, dated July 28, 1874; application filed December 26, 1873.

*To all whom it may concern:*

Be it known that I, STERNE BRUNSON, of Benton Harbor, Michigan, have invented certain Improvements in Nut-Locks, of which the following is a specification:

My invention relates to an improvement in nut-locks; and it consists in a plate thinner near its center than around its outer edges, so as to be flexible at this point, and having projections formed upon its under side to bite into the surface upon which it rests, and a nut which has a ridge or flange formed upon its lower side, which flange presses down upon the thinner portions of the plate and forces the inner teeth down into the bearing-surface upon which the plate bears.

Figure 1 is a vertical section of my invention. Fig. 2 is a perspective of the locking-plate; Fig. 3, an inverted view of the nut.

*a* represents an ordinary screw-bolt, and *c* a nut which screws upon its end, which nut has a raised flange formed around its opening, as shown in Figs. 1 and 3. Over the end of the bolt is passed the locking-plate *d*, which has two or more of its edges, *e*, turned vertically upward, so as to grasp the sides of the nut and cause the two to turn together. Upon the under side of this plate there are formed a number of teeth or ratchets, as shown, which are so shaped as to allow the plate to be forced around in screwing the nut on without catching, but, as soon as the motion is reversed, the teeth catch in their bearing-surface with sufficient force to hold the plate rigidly in position against any common strain that may be brought to bear against it. This plate tapers in thickness toward its center, so as to be thinner around the bolt-hole than around its outer edges, and upon this thinner portion rests the flange *i*, on the under side of the nut.

As the nut is screwed downward the flange first comes in contact with the thin central portion of the plate and bends it downward at this point before it comes in contact with it near its outer edges. This plate being elastic its upward tension binds the nut more firmly to the bolt, and makes it less liable to be shaken loose, while the teeth upon its under side prevent the nut from turning around until turned by some suitable instrument.

Instead of the flange *i* the nut may be simply formed thicker around its opening, and thus answer the same purpose, but the flange is preferred.

Having thus described my invention, I claim—

The combination of the bolt *a*, nut *c*, having the flange *i* formed upon its under side, and the toothed plate *d* made thinner around its center so as to be elastic, substantially as set forth.

STERNE BRUNSON.

Witnesses:
WELLS BROWNE,
S. G. ANTISDALE.